United States Patent [19]
Maemoto et al.

[11] Patent Number: 5,885,674
[45] Date of Patent: Mar. 23, 1999

[54] LINING MATERIAL FOR PIPELINES AND METHOD FOR MANUFACTURING THE SAME

[75] Inventors: Yukikazu Maemoto, Hyogo-ken; Hitoshi Saito, Toyonaka, both of Japan

[73] Assignee: Ashimori Industry Co., Ltd., Osaka-fu, Japan

[21] Appl. No.: 860,629

[22] PCT Filed: Nov. 9, 1995

[86] PCT No.: PCT/JP95/02287

§ 371 Date: Jul. 3, 1997

§ 102(e) Date: Jul. 3, 1997

[87] PCT Pub. No.: WO97/17187

PCT Pub. Date: May 15, 1997

[51] Int. Cl.$^6$ .............................. B29D 22/00; D01D 5/24
[52] U.S. Cl. .................. 428/36.1; 428/36.9; 428/103; 264/209.1
[58] Field of Search .................. 428/36.1, 36.9, 428/36.92, 103; 264/209.1

[56] References Cited

U.S. PATENT DOCUMENTS 4,446,181  5/1984  Wood ........................ 428/36.1

FOREIGN PATENT DOCUMENTS

A-60-32623  2/1985  Japan .
A-1221223   9/1989  Japan .

*Primary Examiner*—Christopher Raimund

[57] ABSTRACT

In the tubular lining material composed by rolling tubularly a sheet-like unwoven fabric, stitching mutually both side edges thereof to obtain a tubular unwoven fabric having a stitched part and forming a continuous synthetic resin tubular coating layer on the surface of this tubular unwoven fabric, as the coating layer is thicker than other parts, the elongation of the stitched part is prevented and pinholes would not occur in the stitched part when the pipeline is repaired.

7 Claims, 4 Drawing Sheets

LINING MATERIAL FOR PIPELINES AND METHOD FOR MANUFACTURING THE SAME

INDUSTRIAL FIELD OF THE INVENTION

The present invention relates to a lining material, for repairing or reinforcing, for the inner surface of pipelines mainly buried under the ground such as gas conduits, city water pipelines, sewer pipelines, power line, communication line or other laid pipelines.

PRIOR ART

The lining material for such pipeline is required to have airtight coating layer for preventing inner fluid from leaking through damaged section of a pipeline or for preventing ground water from infiltrating into the pipeline.

When a pipeline is partially missing, the lining material is required to have considerably strength for ensuring the inner channel by filling such missing section.

As the construction of such lining material, a tubular unwoven fabric wherein an airtight coating layer is formed on a surface corresponding to the inner surface in its lined state is known.

As it is difficult to manufacture unwoven fabric in tubular form, sheet form unwoven fabric has usually been rolled to form a tube and to form coating layer on it.

For example, in the Specification of the U.S. Pat. No. 4,446,181, it is described a lining material for lining wherein an airtight coating layer is formed in tubular form on one surface of a sheet unwoven fabric, which is rolled with the coating layer outside and of which both side edges are stitched up, an airtight narrow ribbon is applied to the surface of the stitched part, then inserted into a pipeline while turning the lining material inside out.

On the other hand, the JP, A, H1-221223 describes a sheet form unwoven fabric which is rolled in a tube form of which both side edges are stitched up and a tubular coating layer is extruded on the outer surface thereof to be integrated therewith. This material is also inserted into a pipeline while turning it inside out to line the inner surface of the pipeline.

PROBLEMS TO BE RESOLVED BY THE INVENTION

In the lining material described in said Specification of U.S. Pat. No. 4,446,181, as the airtightness of the stitched part is ensured by the ribbon pasted to said stitched part, if the adhesion of the ribbon to the coating layer is insufficient, the inner fluid may leak out.

Especially in the lined state, as the ribbon is pasted to the inside of the stitched part, the ribbon may peel off under the pressure of ground water or others infiltrated through a damaged section of the pipeline and the airtightness may be lost.

When the lining material is applied to the inner surface of a pipeline, the lining material slightly expands in diameter of the pipeline to open the stitched part and, as the result, to exert a tensile strength breadthwise to the ribbon attached over said stitched part. Consequently, it is highly probable that the ribbon may peel off when an external force such as said ground water is applied.

In the lining material described in the JP, A, H1-221223, a tubular unwoven fabric stitched in tubular form in order to manufacture this lining material is passed through an extruder and a tube of synthetic resin is extruded onto the surface of the tubular unwoven fabric to form the coating layer. At this time, in order to improve the adhesion of this tube to the tubular unwoven fabric, the pressure is reduced from the inside of the tubular unwoven fabric; however, the air permeability of the stitched part is higher than the other parts in the tubular unwoven fabric as a sheet unwoven fabric is abutted in the stitched part and, moreover, stitched holes of suture are also air-permeable.

As the consequence, when decompressed from inside of the tubular unwoven fabric, the tube is sucked inside at the stitched part of the abutted part of the sheet unwoven fabric or stitched holes so that pinholes may occur. Even if pinholes are not produced, it is inevitable that the stitched part becomes thinner than the other parts.

In these lining materials, when stitched parts or needle holes open in lining as mentioned before, the thinner section may produce pinholes, through which not only the fluid may leak out, but also the tube may begin to burst from a pinhole so as to harm airtightness.

The present invention is devised considering such inconveniences and has an object of providing a lining material comprising a tubularly stitched unwoven fabric in tubular form and a coating layer formed on the surface thereof, wherein said material ensures the airtightness of the coating layer in said stitched part and composes a sure lining.

MEANS FOR RESOLVING THE PROBLEM

The lining material of the present invention is composed by rolling a sheet unwoven fabric (including felt), stitching mutually both side edges thereof to obtain a tubular unwoven fabric and forming a continuous synthetic resin tubular coating layer on the surface of this tubular unwoven fabric, and is characterized in that the coating layer in said stitched part is thicker than the other sections.

The manufacturing method of lining material of the invention is characterized by the steps of rolling a sheet unwoven fabric, stitching mutually both side edges thereof to form a tubular unwoven fabric, extruding a continuous synthetic resin tubular body having a thick section at the position corresponding to said stitched part on the surface of this tubular unwoven fabric by using an extruder and decompressing inside said tubular unwoven fabric to adhere said synthetic resin tubular body integrally with the surface of the tubular unwoven fabric.

Figure 1:
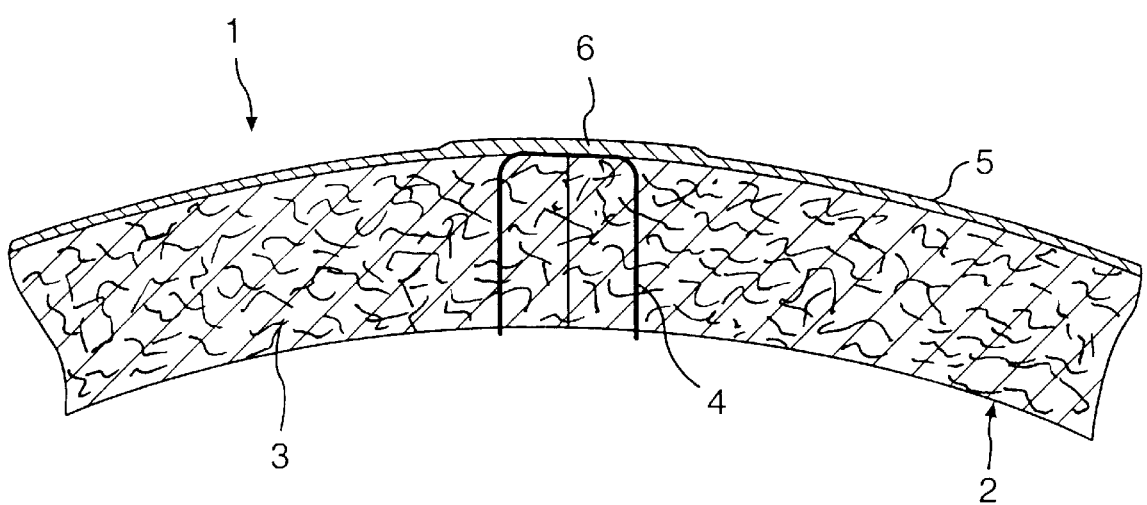
FIG. 1 is a cross sectional view of the main section of the lining material according to the present invention.

FIG. 1 shows a portion of the lining material 1 of the present invention wherein 2 indicates a tubular unwoven fabric composed by rolling a sheet unwoven fabric 3 into a tube and mutually stitching both side edges thereof with a suture 4.

In the tubular unwoven fabric 2, the unwoven fabric 3 may comprise only unwoven fabric, however, most preferably, a unwoven fabric reinforced in the tube longitudinal direction is used. By reinforcing the unwoven fabric in the tube longitudinal direction, the lengthwise elongation is reduced while the lining material 1 is manufactured and the longitudinal elongation of stitched holes in the stitched part is avoided so as to prevent physical properties deterioration such as tearing. To be more specific, a unwoven fabric 3 wherein a plurality of threads are arranged with a large interval in the tube longitudinal direction on the outside or inside surface or in the thicker section thereof, wherein a fabric loose in weave is integrally adhered may be used.

This unwoven fabric 3 is rolled into a tubular shape and both side edges thereof are mutually stitched with a suture 4 to form a tubular unwoven fabric 2. The stitching structure is not particularly limited, however, it is preferable to stitch so as to confront the end faces of both side edges than to stitch in overlapping with each other because the finishing will be neat when the pipeline is repaired.

As such stitching method, both side edges of a unwoven fabric may be confronted for stitching or they may be once piled up for stitching and then the end faces of said both side edges are adjusted to be mutually confronted, and either method may be adopted.

It is preferable to used the suture 4 of low elongation thread for preventing the stitched part from opening and the employment of high strength thread may reduce the diameter of thread or stitching needle so as to reduce the size of stitched holes. This permits to prevent the coating layer 5 on the stitched holes from becoming thinner by suction while manufacturing the lining material 1 and to, as the consequence, reduce the total thickness of the thick section 6. By making needle hole smaller, the strength of the unwoven fabric 3 in the stitched part may be maintained so as to allow to use a lower strength unwoven fabric 3.

Moreover, by reinforcing the tubular unwoven fabric 2 in its tubular lengthwise direction with thread or fabric, its elongation in tubular lengthwise direction may be reduced while manufacturing the lining material 1 so as to permit to avoid the mechanical properties deterioration such as tearing by maintaining the tubular lengthwise strength. The generation of pinhole due to needle hole elongation may also be avoided.

In the pipeline repair, when heat hardening method by steam or hot water is to be used in order to harden thermosetting resin impregnated in the unwoven fabric 3, it is preferable to use heat-resisting suture in addition to conditions mentioned above.

A synthetic resin tubular coating layer 5 is continuously formed on the surface of the tubular unwoven fabric 2 manufactured in this way while a section 6 thicker than the other sections is formed on the coating layer 5 of the stitched part of the unwoven fabric 3.

As coating layer 5, thermoplastic resin or rubber may be used according to the fluid in the pipeline but it is preferable to use polyolefin, polyurethane, polyester, polyamide or the like. The coating layer 5 may also have a laminated structure comprising these resins. For instance, as the inner layer corresponding to the face side of the tubular unwoven fabric 2, one provided for adhering firmly to the unwoven fabric 3 as an adhesion layer, as its exterior layer, one provided with a durability in accordance with the fluid in the pipe and as their intermediate layer, one provided with a function of binder layer may be used in combination.

The thickness of this thick section 6 may conveniently be determined from 1.2 to 3.0 times of that of other sections of the coating layer 5. If it is less than 1.2 times, the effect of the invention may not be expected while if it is superior to 3 times, such excessive thickness may harden the coating layer 5 of this stitched part, making difficult to turning the lining material 1 inside out.

The breadth of the thick section 6 is preferably 1.5 times or more of the stitching width of the suture 4 in the stitched part of the unwoven fabric 3 and less than 1/10 of the circumferential length of the coating layer 5.

If the breadth of the thick section 6 is narrow, the thick section 6 may be shifted from the stitched part of the unwoven fabric 3 when the lining material 1 is manufactured.

On the contrary, if the breadth of the thick section 6 is wide, the dilatation in diameter of the lining material 1 may not be compensated by the elongation of other sections than the thick section 6 to be extended, as the result, if the thick section 6 is extended, stitched part or needle holes in the thick section 6, which are relatively weak in the thick section 6, will be locally extended and the effect of the invention may be unexpected.

The same problem will also be observed when whole the coating layer 5 is made thicker.

According to the present invention, as the thick section 6 is formed on the coating layer 5, the suture 4 is sufficiently fixed with the material of the thick section 6 to prevent the confronted section and needle holes from being stretched. As the strength of stitched part is made higher than that of sections other expect stitched part of the thick section 6, a weak strength stitched part would not be stretched as the case for the lining material described in the JP,A, H1-221223 of the Prior Art.

In order to obtain the expected effect of extending positively other sections (ordinary sections) without stretching the stitched part, the tensile strength of the thick section 6 is 1.5 times or more and, preferably, 2.0 times or more than that of the ordinary sections.

For the manufacturing, it is preferable that both side edges of the thick section 6 gradually reduce their thickness without forming sudden steps and are continuous with the coating layer 5 other than the thick section 6.

Now the method for forming the coating layer 5 on the surface of the tubular unwoven fabric 2 will be described referring to FIG. 2 and FIG. 3.

First, a tubular unwoven fabric 2 is inserted in a hollow extrusion die 17 and a synthetic resin 21 is tubularly extruded over the outer surface of the tubular unwoven fabric 2 from a resin discharge section 24 of this extrusion die 17 to coat and, at the same time, the tubular unwoven fabric 2 is decompressed by a suction device 14 such as vacuum pump. A synthetic resin tubular body 22 is sucked and integrally adhered over the outer surface of the tubular unwoven fabric 2.

The thick section 6 of the coating layer 5 is manufactured by forming a recess 25 corresponding to the thick section 6 on the resin discharge section 24 and by controlling so that the stitched part is positioned within the recess 25.

To be specific, the position of the stitched part of the tubular unwoven fabric 2 to be inserted into the extrusion die 17 is controlled by folding flatly the stitched tubular unwoven fabric 2 with the stitched part beneath and by keeping the fold line of the tubular unwoven fabric 2 in the folded state with a flat plate form jig 16 until just before being inserted into the extrusion die 17. The thick section 6 may be formed stably and automatically on the stitched part by defining the mounting position of the flat plate form jig 16 and the recess 25 at the insertion position of the stitched part into the extrusion die 17.

The lining material 1 shown in FIG. 1 is designed to insert into and line a pipeline by turning inside out its inner and outer surface. The manufacturing method mentioned above is also designated to manufacture this lining material 1.

However, to line a pipeline, it is also possible to introduce directly the lining material 1 into the pipeline and expand it by the inner pressure for lining the pipeline; in this case, the lining material 1 turned inside out in advance or the lining material 1 wherein the coating layer 5 is formed on the inner surface of the tubular unwoven fabric 2 will be used.

[EXAMPLE 1]

Lining material for lining a pipeline of 300 mm in diameter

1. Material used

---

1-1. Unwoven fabric
Composition - Unwoven fabric : Polyester 6d × 74 mm
Performance - Thickness (under 500g/cm² load) 5.0 mm
  Tensile stress Under 10% longitudinal
    elongation 1.2 kg/cm
  Specific weight 1170 g/m²
1-2. Suture Polyester filament suture 500 d × 3
1-3. Stitching needle JIS #26 (needle diameter 2.3 mm)
1-4. Coating layer
Composition - Polyurethane resin : made by Kyowa Hakko Co., Ltd.
  Esten 58271
Performance - Density 1.21 g/cm³
  Tensile breaking strength 469 kg/cm²
  Tensile breaking elongation 600%

---

2. Manufacturing method

Figure 2:
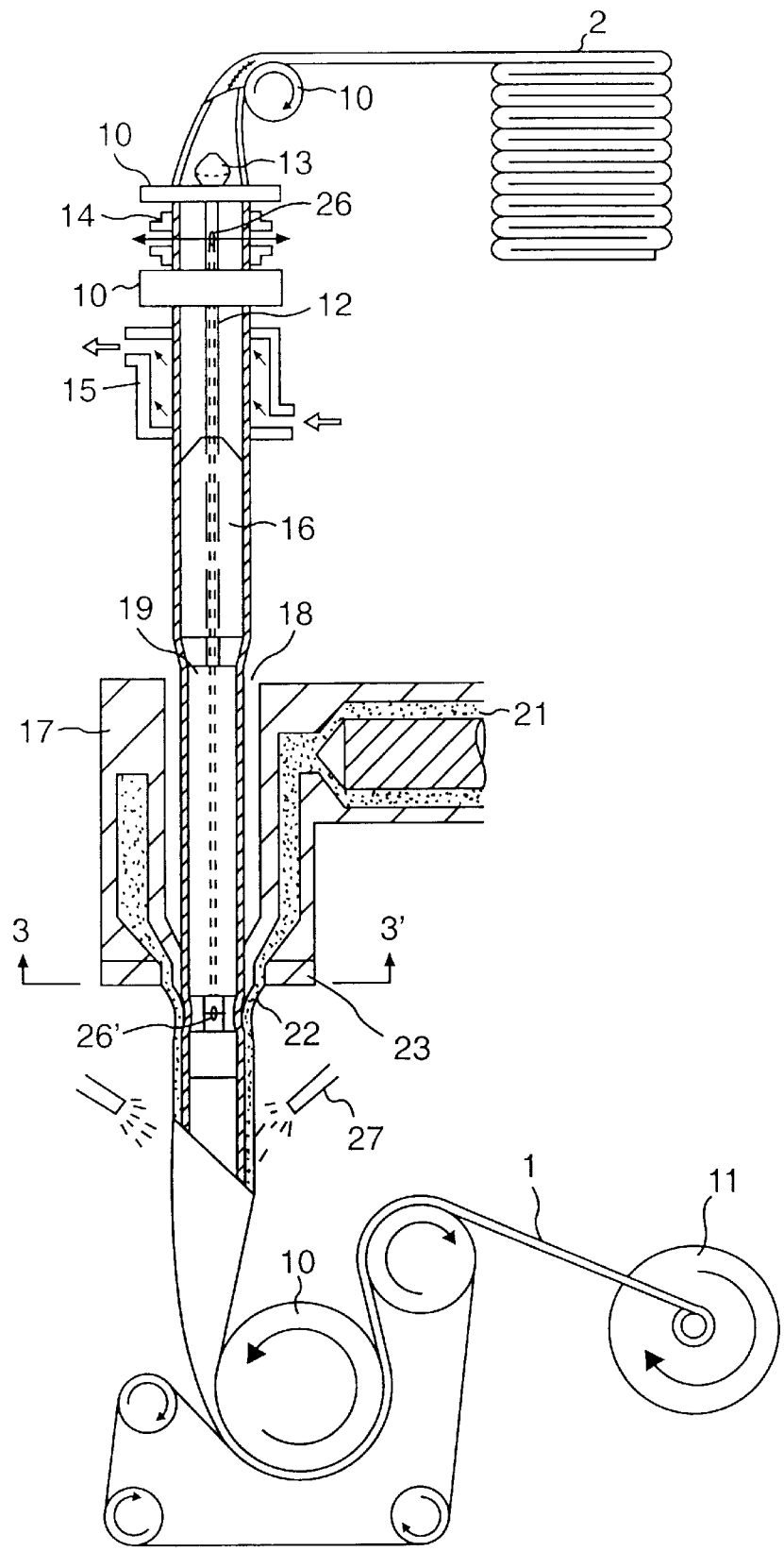
FIG. 2 is a central sectional view of the manufacturing machine of the lining material of the present invention.
Figure 3:
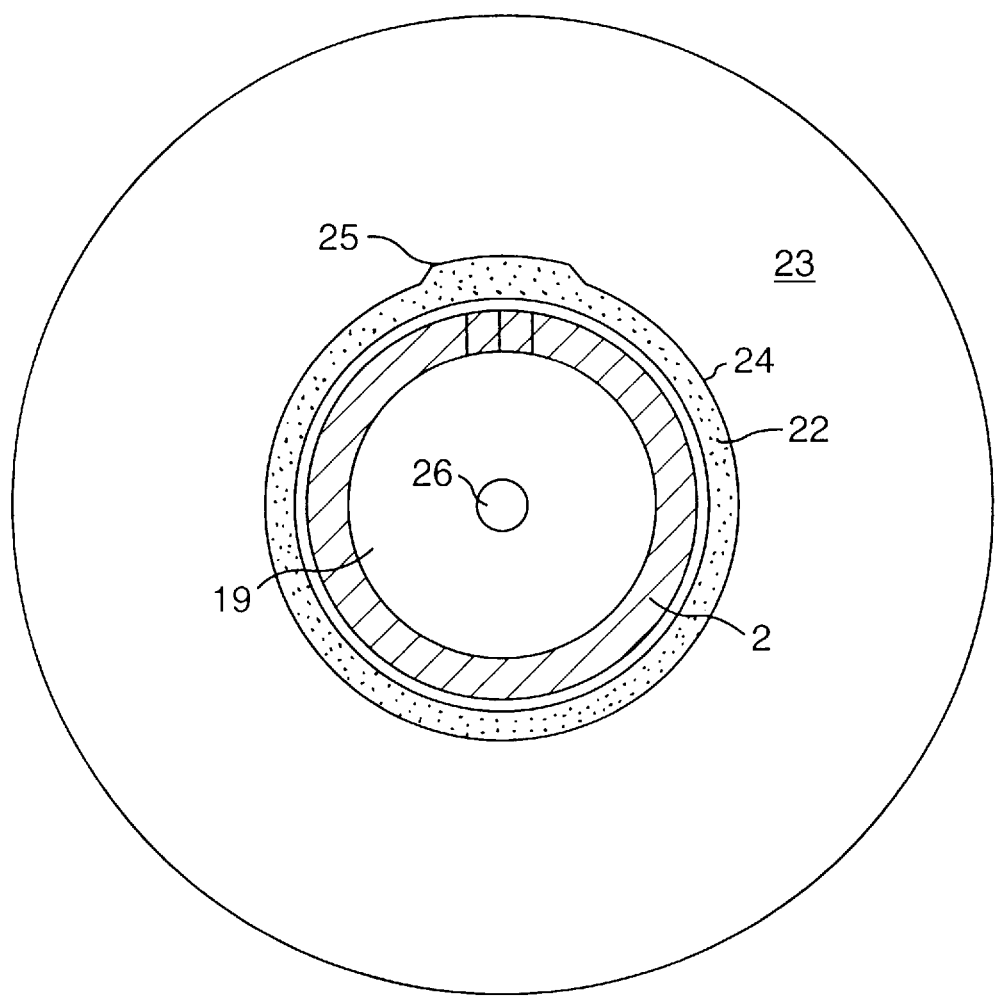
FIG. 3 is a sectional view along the line A–A' of FIG. 2.
Figure 4A:
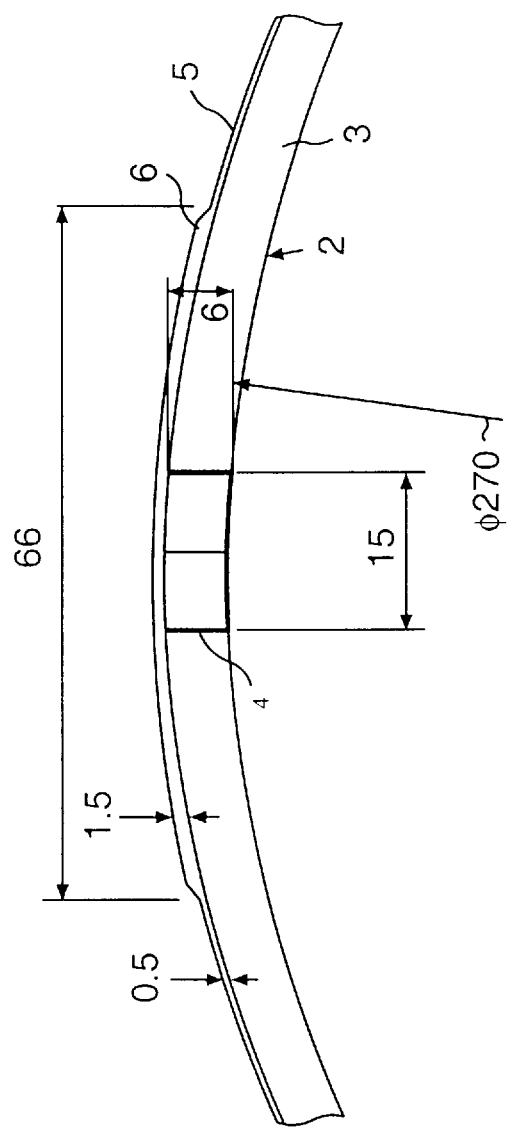
FIG. 4 is a cross sectional view of the main section of an example of the lining material according to the present invention.
Figure 4:
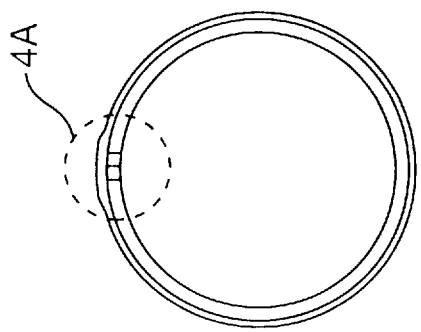

Description in accordance with FIG. 1 to 3.

2-1. Stitching of unwoven fabric (1) The width of unwoven fabric 3 is slit into 900 mm.

(2) Both side edges are piled up and, by means of an over lock sawing machine, stitched with a suture 4 by double chain stitching with a pitch width of about 8 mm.

(3) The fold re-orientation of the tubular unwoven fabric 2 is carried out so that the edges at the stitched part are butted each other and the stitched part is positioned at center of its tubular unwoven fabric 2 part, and the fold line is formed on the tubular unwoven fabric.

2-2. Formation of coating layer (1) The stitched tubular unwoven fabric 2 can be taken up by a plurality of driving rollers 10 at a constant speed downward from the top of the manufacturing machine.

(2) First, a holder 13 to which a shaft 12 is linked is introduced into the inside of the tubular unwoven fabric 2 before passing through the suction device 14 and then the heater 15.

The heater 15 is used to heat beforehand the tubular unwoven fabric 2 and to prevent the adherence from decreasing and the thickness control by manufacturing speed from being disabled when it is rapidly cooled down by the coating of the synthetic resin tubular body 22. The function of the suction device 14 will be described below.

(3) Next, a flat plate jig 16 of substantially the same width as the folded width of the tubular unwoven fabric 2 is passed through the inside of the tubular unwoven fabric 2. The position of both fold lines by the fold of the tubular unwoven fabric 2 is controlled so that the tubular unwoven fabric 2 will always be fed at the predetermined position of the extrusion die 17.

(4) The tubular unwoven fabric 2 released from the flat plate jig 16 is guided into a hollow section 18 of the extrusion die 17. In the tubular unwoven fabric 2, a core 19 (φ272 mm) of substantially the same diameter as the inner diameter of the tubular unwoven fabric 2 is linked with the shaft 12 to form a tube here.

(5) Then, at the bottom of the extrusion die 17, a synthetic resin tubular body 22 made of thermoplastic resin 21 is extruded over the tubular unwoven fabric 2.

As shown in FIG. 3, an external lip 23 is attached to the bottom of the extrusion die 17 and a recess 25 is provided at the synthetic resin discharge section 24 thereof. This recess 25 allows to form a thick section 6 on the outer circumference of the synthetic resin tubular body 22.

(6) Immediately after the extrusion of the synthetic resin tubular body 22 over the tubular unwoven fabric 2, the synthetic resin tubular body 22 is sucked from the inside of the tubular unwoven fabric 2 so as to increase mutual adhesion.

For this suction, the air contained in the tubular unwoven fabric 2 and in the unwoven fabric 3 itself is decompressed by the suction device 14 provided at the top of the manufacturing machine and, at the same time, the air contained in the tubular unwoven fabric 2 immediately after the synthetic resin discharge section 24 is also decompressed through the communication through hole from 26 to 26' defined in the shaft 12.

(7) Thereafter, the cooling device 27 blows cooling water over the coating layer 5 to prevent the coating layer 5 from fusing and then the lining material 1 is taken up by a reel 11 to accomplish the manufacturing.

3. Performance of lining material (1) Outer diameter φ255

(2) Thickness Thick section 7.0 mm, ordinary section 6.0 mm other than thick section (3) Thick section width 45 mm (4) Stitched parts width 15 mm (5) Weight 1480 g/m (6) Adhesion between unwoven fabric and coating layer 0.8 kgf/cm (7) Tensile strength under 5% elongation in diameter
  Thick section: 2.3 kg/cm,
  ordinary section: 0.9 kg/cm,
  Tensile strength under 10% elongation in diameter,
  thick section: 4.2 kg/cm,
  ordinary section: 1.5 kg/cm (8) Expansion in diameter by air: Measured in putting the tubular unwoven fabric 2 outside and at the state of lining the pipeline.

| Pressure (kgf/cm²) | Diameter (mm) | Diametrical expansion rate (%) |
|---|---|---|
| 0.0 | 259.0 | |
| 0.2 | 300.0 | 15.8 |

(9) Pinhole occurrence by steam: Occurred at 0.5 kgf/cm²

[EXAMPLE 2]

Lining material using reinforced unwoven fabric

1. Material used

---

1-1. Unwoven fabric Fabric positioned on the surface of unwoven fabric.
Composition - Unwoven fabric : Polyester 3d × 76 mm 50%
  + Polyester 8d × 64 mm 50%
  Woven fabric: Warp Polyester 20s/2 × 24/inch
    Weft Polyester 20s/2 × 24/inch
  Specific weight : 140g/m²
Performance of unwoven fabric -
  Thickness (under 500g/cm² load) 6.0 mm
  Tensile stress Under 10% longitudinal
    elongation 9.3 kg/cm
  Specific weight 1300 g/m²
1-2. Suture Aramid suture 1500 d × 2
1-3. Stitching needle Same as Example 1
1-4. Coating layer Same as Example 1

2. Manufacturing method
2-1. Stitching of unwoven fabric
   (1) The width of unwoven fabric 3 is slit to 890 mm.
   (2) Both side edges are piled up and, by means of an over lock sawing machine, stitched with a suture 4 by double chain stitching with a pitch width of about 8 mm.
   (3) The fold re-orientation of the tubular unwoven fabric 2 is carried out so that the edges at the stitched part are butted each other and the stitched part is positioned at center of its tubular unwoven fabric 2 part, and the fold line is formed on the tubular unwoven fabric.
2-2. Formation of coating layer Same as Example 1
3. Performance of lining material
   (1) Outer diameter φ280
   In the Example 2, the outer diameter is not reduced and is stretched only by 3 to 4% because the tubular unwoven fabric 2 is reinforced in longitudinal direction, while, in the Example 1, the tubular unwoven fabric 2 has been stretched longitudinally by 20 to 21% during the manufacturing.
   (2) Thickness Thick section 7.5 mm, ordinary section 6.5 mm other than thick section
   It is thicker than the Example 1 by 0.5 mm because it has not been stretched longitudinally during the manufacturing.
   (3) Thick section width 50 mm
   It is wider than the Example 1 by 5 mm because it has not been stretched longitudinally during the manufacturing.
   (4) Stitched part width 15 mm
   (5) Weight 1930 g/m
   (6) Adhesion between unwoven fabric and coating layer 5.7 kgf/cm
   (7) Tensile strength under 5% elongation in diameter,
      Thick section: 5.6 kg/cm,
      ordinary section: 2.7 kg/cm,
      Tensile strength under 10% elongation in diameter,
      Thick section: 9.5 kg/cm,
      ordinary section: 4.1 kg/cm
   (8) Expansion in diameter by air: Measured in putting the tubular unwoven fabric 2 outside and at the state of lining the pipeline.

| Pressure (kgf/cm²) | Diameter (mm) | Diametrical expansion rate (%) |
|---|---|---|
| 0.0 | 284.0 | |
| 0.2 | 300.0 | 5.6 |

(9) Pinhole occurrence by steam: Not occurred at 0.5 kgf/cm²

[EXAMPLE 3]
Lining material using reinforced unwoven fabric and provided with laminated structure of coating layer
1. Material used 1-1. Unwoven fabric Same as Example 2
   1-2. Suture Same as Example 2
   1-3. Stitching needle Same as Example 2
   1-4. Coating layer
   Composition - Inner layer VLDPE : Linix BJ5310 made by Nippon Oil Chemical CO., Ltd.
      - Outer layer SEBS 50% + LLDPE 50% : Ravalon ME9200C made by Mitsubishi Petrochemical Co., Ltd.
   Performance - Inner layer VLDPE (Very Low Density PolyEthylene)
      Density 0.924 g/cm³
      Tensile breaking strength 165 kg/cm²
      Tensile breaking elongation 900%
   Outer layer Product blending LLDPE (Linear Low Density Poly Ethylene) 50% and SEBS (Styrene-EthyleneButhylene-Styrene block copolymer) 50%.
      Density 0.92 g/cm³
      Tensile breaking strength 133 kg/cm²
      Tensile breaking elongation 740%

2. Manufacturing method Same as Example 2
3. Performance of lining material (refer to drawing 4 about the dimension)
   (1) Outer diameter φ283
   (2) Thickness Thick section 7.5 mm, ordinary section 6.5 mm other than thick section
   (3) Thick section width 66 mm
   (4) Stitched part width 15 mm
   (5) Weight 1650 g/m
   (6) Adhesion between unwoven fabric and coating layer 2.0 kgf/cm
   (7) Tensile strength under 5% diametric elongation,
      Thick section: 4.6 kg/cm,
      ordinary section: 2.5 kg/cm,
      Tensile strength under 10% elongation in diameter,
      Thick section: 8.4 kg/cm,
      ordinary section: 5.3 kg/cm
   (8) Expansion in diameter by air: Measured in putting the tubular unwoven fabric 2 outside and at the state of lining the pipeline.

| Pressure (kgf/cm²) | Diameter (mm) | Diametrical expansion rate (%) |
|---|---|---|
| 0.0 | 287.3 | |
| 0.2 | 300.3 | 4.5 |

(9) Pinhole occurrence by steam: Not occurred at 0.5 kgf/cm²

[Comparative Example 1]
Lining material without the thick section formation of the Prior Art
   1. Material used Same as Example 3
   2. Manufacturing method Same as Example 3 except that the synthetic resin discharge section 24 of the outer lip 23 is genuinely round.
   3. Performance of lining material
      (1) Dimensions Same as Example 3 except f or the thick section.
      (2) Pinhole occurrence by steam: Occurred at 0.1 to 0.2 kgf /cm². As the thick section 6 is not formed, steam easily gets through the coating layer 5 from needle holes of the stitched part.

Effect of the Invention
   According to the present invention, as a continuous synthetic resin tubular coating layer 5 is integrally formed all around the circumferential surface of the tubular unwoven fabric 2, the ribbon protecting the stitched part would not peel off as it was the case for the one described in said Specification of the U.S. Pat. No. 4,446,181.
   Moreover, as the coating layer 5 covering the stitched part is thick, the suture 4 is firmly fixed with the material of the thick section 6 to prevent the confronted section and needle holes from stretching and, at the same time, the strength of the stitched part is made higher than the other sections expect the thick section 6. The stitched part is prevented positive from stretching by elongation of the other sections than the stitched part when the lining material 1 is submitted to expansion in diameter. As the result, pinholes would not be occurred by the extension of the stitched part when the pipeline is repaired, as it was the case for the lining material described in the JP, A, H1-221223, so as to allow ensuring an airtightness required for the lining material 1.

By using suture composed of low elongation high strength fiber as the suture 4, the stitched part is prevented from opening and, at the same time, the size of suture or stitching needle may be controlled to reduce the size of the needle hole made by stitching so as to prevent the coating layer 5 above the needle hole from thinning by suction when the lining material 1 is manufactured. By reducing the size of the needle hole, the strength of the unwoven fabric 3 in the stitched part may be maintained allowing to use a unwoven fabric 3 of lower strength.

By reinforcing longitudinally the tubular unwoven fabric 3 with thread or fabric, the longitudinal elongation may be controlled during the manufacturing of the lining material 1 allowing to prevent the needle hole of the stitched part from longitudinally stretching and the tube strength in the lengthwise direction may be maintained permitting to prevent the deterioration of mechanical properties such as tearing. Pinhole production due to the elongation of the needle hole may also be restrained.

In the lining material 1 obtained by the manufacturing method according to the present invention, as the thick section 6 is formed on the coating layer 5 in the stitched part of the tubular unwoven fabric 2, even when the coating layer 5 in the stitched part becomes some thinner by the decompression during the formation of the coating layer 5, pinhole would not be produced because this section is inherently thick, allowing to ensure the airtightness.

During the lining, even when the tubular unwoven fabric 2 expands so as to open somewhat the stitched part, as the coating layer 5 of this section is the thick section 6, its strength prevents the stitched part from opening and the coating layer 5 from tearing.

The lining material of the present invention may be manufactured by forming the recess 25 corresponding to the thick section 6 at the discharge section 24 and by controlling the stitched part to be positioned in the recess 25.

By aligning the position of the stitched part and the position of the recess of the discharge section, the thick section 6 maybe formed stably and automatically on the stitched part.

What is claimed is:

1. A tubular lining material composed by tubularly rolling an unwoven fabric sheet, stitching both side edges mutually thereof to obtain a tubular unwoven fabric having a stitched part and continuously forming a synthetic resin tubular coating layer on the surface of said tubular unwoven fabric, wherein said coating layer in said stitched part is thicker in an amount of 1.2 to 3.0 times the other parts.

2. The tubular lining material according to claim 1, wherein said stitched part is formed of a suture made with a low elongation and high tensile strength fiber.

3. The tubular lining material according to claim 1 or 2, wherein said unwoven fabric is longitudinally reinforced with threads or fabrics.

4. The tubular lining material according to claim 1, wherein said coating layer is provided with a lamination structure.

5. The tubular lining material according to claim 1, wherein the width of said thick part of said coating layer is at least 1.5 times the stitching width of said suture in said stitched part of said unwoven fabric and up to 1/10 times the circumferential length of said coated layer.

6. A method of manufacturing a tubular lining material comprising the steps of:

rolling tubularly a sheet unwoven fabric, stitching mutually both side edges thereof to obtain a tubular unwoven fabric having said stitched part, extruding a synthetic resin to form a continuous tubular coating layer having a thick part at a position corresponding to said stitched part on the surface of said tubular unwoven fabric, said coating layer in said stitched part is thicker in an amount of 1.2 to 3.0 times the other parts, and decompressing the inside of said tubular woven fabric to integrally make said synthetic resin adhere to the surface of said tubular unwoven fabric.

7. The method of claim 6:

wherein said thick part of said coating layer is formed at said position corresponding to said stitched part of said tubular unwoven fabric by forming a recess at a discharge section of said extruder.

* * * * *